United States Patent
Moia et al.

(10) Patent No.: US 12,116,082 B2
(45) Date of Patent: Oct. 15, 2024

(54) METHOD FOR OPERATING A TWO-WHEELER

(71) Applicant: Robert Bosch GmbH, Stuttgart (DE)

(72) Inventors: Alessandro Moia, Holzgerlingen (DE); Atsushi Nakamura, Niigata (JP); Daniel Baumgaertner, Tuebingen (DE); Felix Dauer, Tuebingen (DE); Georg Widmaier, Leonberg (DE); Oliver Maier, Stuttgart (DE); Silas Klug, Magstadt (DE); Steffen Heil, Pfullingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 204 days.

(21) Appl. No.: 17/959,762

(22) Filed: Oct. 4, 2022

(65) Prior Publication Data

US 2023/0110547 A1   Apr. 13, 2023

(30) Foreign Application Priority Data

Oct. 8, 2021 (DE) ...................... 10 2021 211 390.7

(51) Int. Cl.
- B62M 6/50 (2010.01)
- B60T 8/17 (2006.01)
- B60T 8/1755 (2006.01)

(52) U.S. Cl.
CPC ............ *B62M 6/50* (2013.01); *B60T 8/1706* (2013.01); *B60T 8/17554* (2013.01); *B60T 2230/03* (2013.01)

(58) Field of Classification Search
CPC ..... B62M 6/50; B60T 8/1706; B60T 8/17554; B60T 2230/03; B60T 8/171; B62J 45/413;
(Continued)

(56) References Cited

U.S. PATENT DOCUMENTS 9,162,726 B2 * 10/2015 Takenaka ............... B62K 21/10
2009/0139793 A1 * 6/2009 Suzuki ................... B62K 21/00
                                                                180/446
(Continued)

FOREIGN PATENT DOCUMENTS

DE   102008013102 A1   4/2009
DE   102013215293 A1   5/2014
(Continued)

*Primary Examiner* — Sze-Hon Kong
(74) *Attorney, Agent, or Firm* — NORTON ROSE FULBRIGHT US LLP; Gerard A. Messina

(57) ABSTRACT

A method for operating a two-wheeler. The two-wheeler includes a drive unit and a sensor system, the sensor system including a rotation rate sensor, an acceleration sensor, and a wheel speed sensor. The wheel speed sensor detects at least one measuring pulse per revolution of a wheel of the two-wheeler. The method includes: detecting three-dimensional rotation rates of the two-wheeler, detecting acceleration values of the two-wheeler, and estimating a motion state of the two-wheeler based on the detected rotation rates, the motion state including estimated values for estimated acceleration values and an estimated speed and an estimated distance covered, first correction of the estimated motion state based on the detected acceleration values, ascertaining an instantaneous steering angle of the two-wheeler based on the corrected estimated motion state, and actuating the drive unit and/or an antilocking system of the two-wheeler as a function of the ascertained instantaneous steering angle.

18 Claims, 5 Drawing Sheets

(58) Field of Classification Search
CPC ...... B62J 45/41; B60W 10/08; B60W 10/188;
B60W 30/18109; B60W 2050/0026;
B60W 2050/0031; B60W 2050/0033;
B60W 30/045; B60W 30/18172; B60W
2300/36; B60W 2520/105; B60W
2520/125; B60W 2520/14; B60W
2520/16; B60W 2520/18; B60W 2520/28;
B60W 2552/15; B60W 2710/083; B60W
2710/182; B60W 40/10; B62L 3/023;
G01P 3/487; G01P 21/02; G01C 22/002
See application file for complete search history.

(56) References Cited

U.S. PATENT DOCUMENTS

| | | | |
|---|---|---|---|
| 2018/0197401 A1 | 7/2018 | Khaligh et al. | |
| 2019/0210592 A1* | 7/2019 | Wahl | B60W 30/045 |
| 2019/0263210 A1* | 8/2019 | Nasu | B60T 8/172 |
| 2020/0094840 A1* | 3/2020 | Nolin | B60W 30/18172 |
| 2021/0269043 A1* | 9/2021 | Takahashi | A61B 5/18 |
| 2022/0340171 A1* | 10/2022 | Halder | G05D 1/0088 |
| 2022/0340203 A1* | 10/2022 | Iizuka | B62K 21/00 |
| 2023/0086051 A1* | 3/2023 | Huelsmann | B60W 10/184 |

FOREIGN PATENT DOCUMENTS

| | | |
|---|---|---|
| EP | 3209529 A1 | 8/2017 |
| EP | 3828070 A1 | 6/2021 |
| JP | H0995287 A | 4/1997 |

* cited by examiner

METHOD FOR OPERATING A TWO-WHEELER

FIELD

The present invention relates to a method for operating a two-wheeler, and a two-wheeler.

BACKGROUND INFORMATION

Some conventional two-wheelers include drive units and antilocking systems. Controlling the drive unit and the antilocking system frequently takes place, at least in part, as a function of motion variables such as a speed of the two-wheeler. Such motion variables are generally detected with the aid of sensor systems of the two-wheeler. In addition, sensor systems are available, with the aid of which motion variables such as speed, distances covered, accelerations, and rotation rates of two-wheelers may be detected. In particular for bicycles, detection of the speed often takes place with the aid of so-called Reed sensors. A magnet is typically fastened to a wheel of the bicycle. With the aid of a magnetic sensor fastened to a frame of the bicycle, a pulse is detected per revolution of the wheel in order to ascertain the speed of the bicycle based on a frequency of the pulses and the wheel circumference. For reasons of cost, simplicity, and weight, frequently only a single-pulse sensor with a single magnet at the wheel is used. However, in particular at low speeds, a high level of inaccuracy is often present. It is also conventional to increase the accuracy using multipulse sensors, but this increases the complexity, cost, and weight.

SUMMARY

In contrast to the related art, the method according to the present invention is characterized by a particularly simple and cost-effective method via which very precise motion variables of a two-wheeler may be ascertained and used for controlling a drive unit and/or an antilocking system with high precision. In particular, high accuracy may be achieved even at very low speeds. This may be achieved according to an example embodiment of the present invention by a method for operating a two-wheeler, the two-wheeler including a drive unit, preferably an antilocking system, and a sensor system. The drive unit is preferably an electric motor. The sensor system includes a rotation rate sensor, an acceleration sensor, and a wheel speed sensor. The wheel speed sensor is in particular a rotation sensor, and is designed to detect at least one measuring pulse per revolution of a wheel of the two-wheeler. The wheel speed sensor is preferably a single-pulse Reed sensor that includes exactly one magnet that is fastened to the wheel and rotates with the wheel, and in particular a receiver that detects exactly one measuring pulse when it passes by the magnet. The method according to an example embodiment of the present invention includes the following steps:
  detecting rotation rates, in particular three-dimensional rotation rates, of the two-wheeler with the aid of the rotation rate sensor,
  detecting acceleration values of the two-wheeler with the aid of the acceleration sensor,
  estimating a motion state of the two-wheeler based on the detected rotation rates,
  the motion state including estimated values for estimated acceleration values and for an estimated speed and for an estimated distance covered,
  first correction of the estimated motion state based on the detected acceleration values,
  ascertaining an instantaneous steering angle of the two-wheeler based on the corrected estimated motion state, and
  actuating the drive unit and/or the antilocking system as a function of the ascertained instantaneous steering angle.

In particular, ascertained or computed values of the particular parameters, i.e., the estimated acceleration values, the estimated speed, and the estimated distance covered, are regarded as estimated values. In other words, in particular a numerical value, preferably including the appropriate measuring unit, is regarded as an estimated value. In particular, the motion state includes a separate estimated value for each such parameter. In particular, the estimated values are iteratively optimized by the method to allow the desired parameters to be ascertained on this basis.

With the aid of the rotation rate sensor, three-dimensional rotation rates are preferably detected which in each case include a rotation rate about a longitudinal axis, which in particular is oriented in the travel direction, about a vertical axis, and about a pitch axis which is perpendicular to the longitudinal axis and to the vertical axis.

In other words, in the method the rotation rates, in particular three-dimensional rotation rates, are detected with the aid of the rotation rate sensor, and on this basis a general motion state of the two-wheeler, which also includes further motion variables such as the estimated speed and the estimated distance covered, is estimated. This estimated motion state is subsequently corrected based on the additionally present acceleration values of the acceleration sensor, in particular based on a comparison of the estimated acceleration values to the actual acceleration values. In particular, the estimated acceleration values may be corrected based directly on the measured acceleration values that are present. At the same time, the further motion variables of the motion state, for example the estimated speed and the estimated distance covered, are corrected, preferably based on this correction step. The instantaneous steering angle of the two-wheeler may be subsequently ascertained based on the corrected motion state.

An angle between a longitudinal direction of the two-wheeler and a front wheel of the two-wheeler, projected onto a plane perpendicular to the vertical axis, i.e., onto a base surface plane, for example, is regarded as a steering angle.

According to an example embodiment of the present invention, the steering angle is preferably always ascertained as an absolute value. This means that a deflection of the wheel to the left or right in each case results in a specific positive value of the steering angle.

The method is thus characterized in that particularly comprehensive and precise motion variables concerning the motion of the bicycle may be ascertained using a comparatively simple and cost-effective sensor system. In particular, for detecting accurate, high-resolution steering angles a complicated and costly sensor system may be dispensed with, even at low speeds, which is particularly advantageous in the application involving a bicycle.

By use of the precise, high-resolution steering angle, a particularly precise actuation of the drive unit and/or of the antilocking system which is optimally adapted to different conditions may thus take place. In particular when negotiating curves having a small radius and/or during braking maneuvers, in particular at low speed, a particularly accurate coordination may take place in such a way that, for example, hazardous riding situations may be avoided.

It is noted that in the case of a steering angle-dependent actuation of solely the drive unit, the two-wheeler may also be designed without an antilocking system.

Preferred refinements of the present invention are disclosed herein.

According to an example embodiment of the present invention, the method preferably also includes the following step when an actuation of the drive unit takes place as a function of the ascertained instantaneous steering angle: adapting a drive torque of the drive unit. This is particularly advantageous when the two-wheeler is an electric bicycle, the drive unit being provided for generating a drive torque that is used to assist a manual pedaling force from the rider of the electric bicycle. In other words, steering angle-dependent assistance may be provided. By adapting the drive torque as a function of the instantaneous steering angle, the occurrence of reduced controllability or a critical situation due to a drive torque that is not adapted to the instantaneous riding operation, for example a cornering or turning maneuver, may be avoided in a particularly reliable manner. For this purpose, it is particularly advantageous when a reduction of a maximum allowed drive torque takes place with the method at large steering angles, for example greater than or equal to 10°.

According to an example embodiment of the present invention, the drive torque is particularly preferably adapted based on a lookup table, the lookup table including a predefined drive torque profile as a function of the steering angle. Steering angle-dependent assistance may thus be provided in a particularly simple and cost-effective manner.

The lookup table is preferably designed in such a way that the drive torque profile is constant up to a predefined maximum steering angle, preferably a maximum of 10°. For a steering angle that is greater than the predefined maximum steering angle, the drive torque profile is linearly dependent on the steering angle, preferably in such a way that the drive torque decreases as the steering angle increases. A particularly advantageous and comfortable riding operation may thus be provided which allows maximum drive power at small steering angles, and reliably reduces the drive torque at larger steering angles to allow critical riding situations to be avoided.

According to an example embodiment of the present invention, it is further preferred that the method also includes the step: ascertaining an instantaneous gradient of a roadway on which the two-wheeler is situated. The drive torque is additionally adapted as a function of the ascertained gradient. In particular, the drive torque is adapted as a function of the gradient in such a way that for a high positive gradient which the two-wheeler is ascending, for example, at least one predefined minimum drive torque is provided. The situation may thus be prevented that the steering angle-dependent assistance reduces the drive torque so greatly that a comfortable ride at a steep gradient would be precluded.

According to an example embodiment of the present invention, the method preferably also includes the following step when an actuation of the antilocking system takes place as a function of the instantaneous steering angle: adapting a brake pressure in a braking system, preferably a hydraulic braking system, of the two-wheeler. A brake pressure, in particular a maximum brake pressure, during an antilocking operation is advantageously adapted in such a way that the brake pressure is reduced for a large or increasing steering angle. This means that the steering angle is additionally taken into account by the antilocking system in controlling the brake pressure, to allow a braking maneuver that is particularly efficient and at the same time safe.

According to an example embodiment of the present invention, the adaptation of the brake pressure particularly preferably includes a control of a pressure gradient of the brake pressure, i.e., a temporal change in the brake pressure, in particular during an antilocking operation. A control of a sensitivity factor and/or of a maximum pressure of the pressure gradient particularly preferably takes place. A particularly fine coordination of the antilocking operation with the instantaneous riding conditions of the two-wheeler may thus be made possible.

According to an example embodiment of the present invention, the adaptation of the brake pressure preferably includes: controlling a tire slip during a braking operation of the two-wheeler. A further antilocking control that is optimally adapted to the base surface and to the instantaneous riding conditions of the two-wheeler may thus be made possible.

According to an example embodiment of the present invention, it is further preferred that the method also includes the step: ascertaining an instantaneous speed of the two-wheeler and/or a distance covered by the two-wheeler, based on the corrected motion state. The actuation of the drive unit and/or of the antilocking system may preferably additionally take place as a function of the ascertained instantaneous speed of the two-wheeler and/or as a function of the distance covered by the two-wheeler.

According to an example embodiment of the present invention, the method preferably also includes the following step: second correction of the motion state based on the measuring pulses that are detected with the aid of the wheel speed sensor. The second correction preferably takes place each time that a measuring pulse that is detected with the aid of the wheel speed sensor is present. Particularly high accuracy in ascertaining the motion variables may thus be achieved, since with the aid of the measuring pulses that are detected by the wheel speed sensor whenever such measuring pulses are present, particularly accurate data are available and may be used for optimizing the motion state.

The second correction is particularly preferably carried out based on the following equation: $y2=[x5,\text{old}+2\pi r]$, where $y2$ is a corrected value for a distance covered by the two-wheeler, $x5,\text{old}$ is an old, i.e., chronologically preceding, value for the distance covered by the two-wheeler, and $r$ is a radius of a wheel of the two-wheeler. In particular, $y2$ is the estimated covered distance of the motion state. In other words, at each point in time at which a measuring pulse of the wheel speed sensor is present, the estimated covered distance of the motion state is replaced by the exact measured value from the wheel speed sensor.

One or multiple of the following motion variables of the two-wheeler are preferably ascertained, based on the corrected motion state: roll angle, pitch angle, and longitudinal acceleration. Particularly accurate information about the instantaneous movement of the two-wheeler may thus be obtained.

According to an example embodiment of the present invention, it is further preferred that the first correction is carried out with the aid of a nonlinear Kalman filter. A particularly efficient and precise correction of the motion state may thus be carried out in a simple manner.

The estimation of the motion state of the two-wheeler is preferably carried out with the aid of a state vector $$x = \begin{bmatrix} x1 \\ x2 \\ x3 \\ x4 \\ x5 \end{bmatrix},$$

using an input vector $$u = \begin{bmatrix} u1 \\ u2 \\ u3 \end{bmatrix},$$

and based on the following system equation:

$$\dot{x} = \begin{bmatrix} u1 + \tan(x2)\sin(x1)u2 + \tan(x2)\cos(x1)u3 \\ \cos(x1)u2 - \sin(x1)u3 \\ 0 \\ x3 \\ x4 \end{bmatrix}.$$

In particular, input vector u may be regarded as an input of system equation $\dot{x}$. x1 is a roll angle, x2 is a pitch angle, x3 is a longitudinal acceleration, x4 is a longitudinal speed, and x5 is a distance covered. In addition, u1, u2, and u3 are the three-dimensional rotation rates. In particular, system equation $\dot{x}$ corresponds to a temporal change in the motion state.

The estimation of the motion state of the two-wheeler preferably takes place based on a computation of an integral of system equation $\dot{x}$. In particular, after the integration of the system equation, the correspondingly obtained components of the motion state may be directly used as estimated values for the acceleration values, the speed, and the distance covered.

It is further preferred that the estimation of the motion state of the two-wheeler is also carried out based on the following equations:

$$Rx = \begin{bmatrix} 1 & 0 & 0 \\ 0 & \cos(x1) & \sin(x1) \end{bmatrix},$$

$$Ry = \begin{bmatrix} \cos(x2) & 0 & -\sin(x2) \\ 0 & 1 & 0 \\ \sin(x2) & 0 & \cos(x2) \end{bmatrix},$$

$$\dot{\psi} = \frac{(u2\sin(x1) + u3\cos(x1))}{\cos(x2)},$$

$$y1 = RxRy \begin{bmatrix} x3 \\ -x4\dot{\psi} \\ g \end{bmatrix},$$

where $\dot{\psi}$ is a yaw rate of the two-wheeler, and y1 are the estimated acceleration values y1 of the two-wheeler. In particular, a rotational speed of the two-wheeler about the longitudinal axis is regarded as the yaw rate. In particular, the first correction is carried out by correcting estimated acceleration values y1.

According to an example embodiment of the present invention, the method preferably also includes the step: ascertaining a standstill of the two-wheeler based on the estimated motion state. In addition, a distinction may preferably be made between a total of three riding modes: standstill, travel, and transition. The riding modes may preferably be ascertained based on predefined threshold values, for example the estimated speed. Information about an instantaneous riding state of the two-wheeler may thus be obtained in a particularly simple and unambiguous manner. In addition, the ascertained riding states such as standstill may be utilized to allow further optimizations of the method to be carried out for increasing the accuracy of ascertaining the motion state.

According to an example embodiment of the present invention, the method preferably also includes the steps:
reducing state vector x and system equation $\dot{x}$ to the following states:

$$x = \begin{bmatrix} x1 \\ x2 \end{bmatrix} \text{ and}$$

$$\dot{x} = \begin{bmatrix} u1 + \tan(x2)\sin(x1)u2 + \tan(x2)\cos(x1)u3 \\ \cos(x1)u2 - \sin(x1)u3 \end{bmatrix}$$

when no measuring pulses have been detected by the wheel speed sensor over at least one predefined time period, or when a standstill of the vehicle has been ascertained, and
expanding state vector x and system equation $\dot{x}$ to the original states prior to the reduction, when measuring pulses have once again been detected by the wheel speed sensor.

This means that during a standstill, or when the wheel speed sensor detects no measuring pulses for some other reason, state vector x and system equation $\dot{x}$ are reduced to the respective first two states. Drifting of the estimated values of the motion state, which may occur when no correction is possible due to the absence of a speed signal, may thus be avoided.

The ascertainment of steering angle $\delta$ preferably takes place based on the following equation:

$$\delta = \arctan\left(\frac{\dot{\psi}L}{x4}\right),$$

where $\dot{\psi}$ is the yaw rate, L is a wheelbase of the two-wheeler, and x4 is a longitudinal speed. In particular, the wheelbase corresponds to a distance between the two wheel hubs or axles of the two-wheeler. It is preferably additionally provided to carry out the computation of this equation in such a way that the expression in the denominator assumes no values around zero, in order to avoid numerical problems that arise for this reason. For this purpose, an ascertained minimum speed is preferably used as longitudinal speed x4. The computation of the steering angle is preferably carried out only during recognized travel of the two-wheeler, and in particular is prevented during a recognized standstill of the two-wheeler.

Moreover, the present invention relates to a two-wheeler, including a drive unit, an antilocking system, and a sensor system which includes a rotation rate sensor, an acceleration sensor, and a wheel speed sensor. In addition, the two-wheeler includes a control device that is configured to carry out the described method for operating the two-wheeler. Furthermore, the control device is configured to controllably actuate the drive unit and/or the antilocking system. The wheel speed sensor is preferably a single-pulse Reed sensor that includes exactly one magnet that is fastened to the wheel and rotates with the wheel. The two-wheeler is characterized in that the motion variables may be ascertained with high temporal resolution and high accuracy, with a particularly simple and cost-effective design of the sensor system. Based on these motion variables, a particularly precise and optimally coordinated actuation of the drive unit and/or of the antilocking system may take place.

The two-wheeler is preferably designed as an electrically driven, in particular electrically driven and/or drivable, bicycle, which in particular may also be referred to as an electric bicycle.

BRIEF DESCRIPTION OF THE DRAWINGS

The present invention is described below based on exemplary embodiments in conjunction with the figures. In the figures, functionally equivalent components are in each case denoted by the same reference numerals.

DETAILED DESCRIPTION OF EXAMPLE EMBODIMENTS

Figure 1:
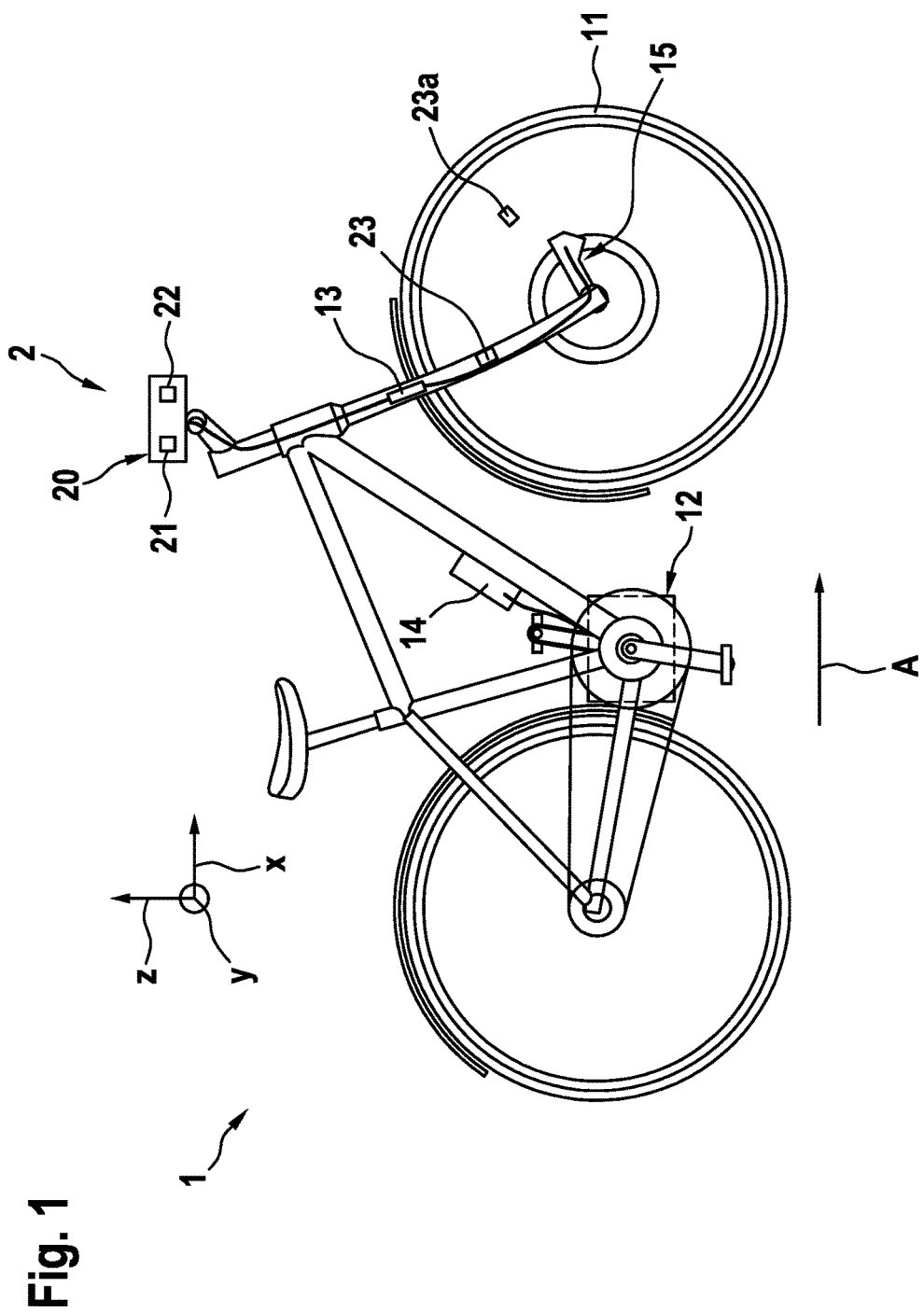
FIG. 1 shows a simplified schematic view of a two-wheeler that includes a sensor system and a control device for carrying out a method according to one preferred exemplary embodiment of the present invention.

FIG. 1 shows a simplified schematic view of a two-wheeler 1 that includes a sensor system 2 and a control device 20 for carrying out a method for ascertaining motion variables of two-wheeler 1 according to one preferred exemplary embodiment of the present invention.

Two-wheeler 1 is an electric bicycle, which in the area of a bottom bracket ball bearing includes a drive unit 12, with the aid of which a manually generated pedaling force from a rider of two-wheeler 1 may be motor-assisted. Drive unit 12 is supplied with electrical energy by an electrical energy store 14.

In addition, two-wheeler 1 includes an antilocking system 13 that is configured to actuate a hydraulic braking system 15 of two-wheeler 1. Antilocking system 13 is operable in an antilocking operation in which antilocking system 13 carries out a pressure modulation of a hydraulic brake pressure in hydraulic braking system 15 in order to prevent locking of wheel 11 during a braking maneuver. Antilocking system 13 is in particular connected to control device 20, and is actuatable with the aid of control device 20.

Control device 20 is situated at the handlebars of two-wheeler 1, and may be part of an onboard computer, for example.

Sensor system 2 includes multiple sensors. In detail, sensor system 2 includes a rotation rate sensor 21 and an acceleration sensor 22, both of which are integrated into control device 20.

Three-dimensional rotation rates of two-wheeler 1 are detected during travel with the aid of rotation rate sensor 21. A rotation rate is detected about each of axes x, y, z indicated in FIG. 1 (cf. also FIGS. 2 and 3).

The x axis is in parallel to a longitudinal axis L of two-wheeler 1 (cf. FIG. 2), which for straight-ahead travel of two-wheeler 1 is in parallel to a travel direction A. The z axis corresponds to a vertical axis H (cf. FIG. 3), which in particular is in parallel to a gravitational direction (not illustrated) of the earth's gravitational field. The y axis is perpendicular to the x axis and perpendicular to the z axis. The y axis may also be referred to as the pitch axis. In addition, the z axis may also be referred to as the yaw axis.

Acceleration values, preferably a total of three acceleration values, of two-wheeler 1 are detected along each of axes x, y, z with the aid of acceleration sensor 22.

In addition, sensor system 2 includes a single-pulse wheel speed sensor 23, designed as a rotation sensor, for detecting exactly one measuring pulse per revolution of a wheel 11 of two-wheeler 1. For this purpose, the wheel speed sensor is configured to detect the measuring pulse exactly once per revolution of wheel 11 each time it passes by a magnet 23a, which, for example, is fastened to a spoke of wheel 11. A rotational speed of wheel 11 may thus be ascertained, based on the measuring pulses that are detected with the aid of wheel speed sensor 23.

An instantaneous speed of two-wheeler 1, a distance covered, and an instantaneous steering angle δ are ascertained as motion variables of two-wheeler 1 with the aid of method 50.

Figure 2:
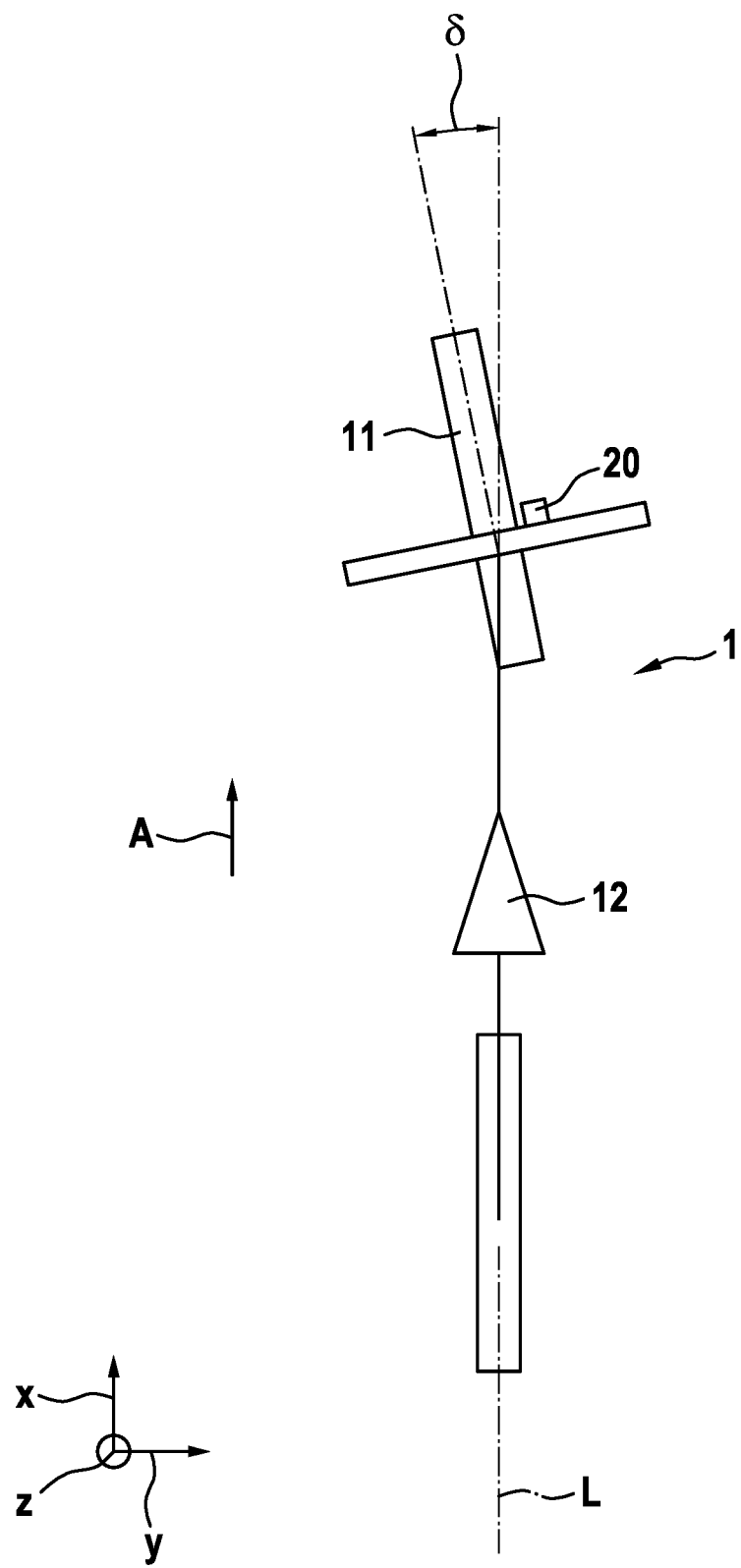
FIG. 2 shows an alternative view of the two-wheeler from FIG. 1 for illustrating a steering angle.

Steering angle δ is illustrated in FIG. 2. FIG. 2 shows a view of two-wheeler 1 along the z axis. As is apparent in FIG. 2, steering angle δ corresponds to an angle between longitudinal axis L and front wheel 11. For straight-ahead travel, steering angle δ is equal to zero, and is correspondingly greater the smaller the radius of curvature of the curve that is negotiated by two-wheeler 1.

Figure 3:
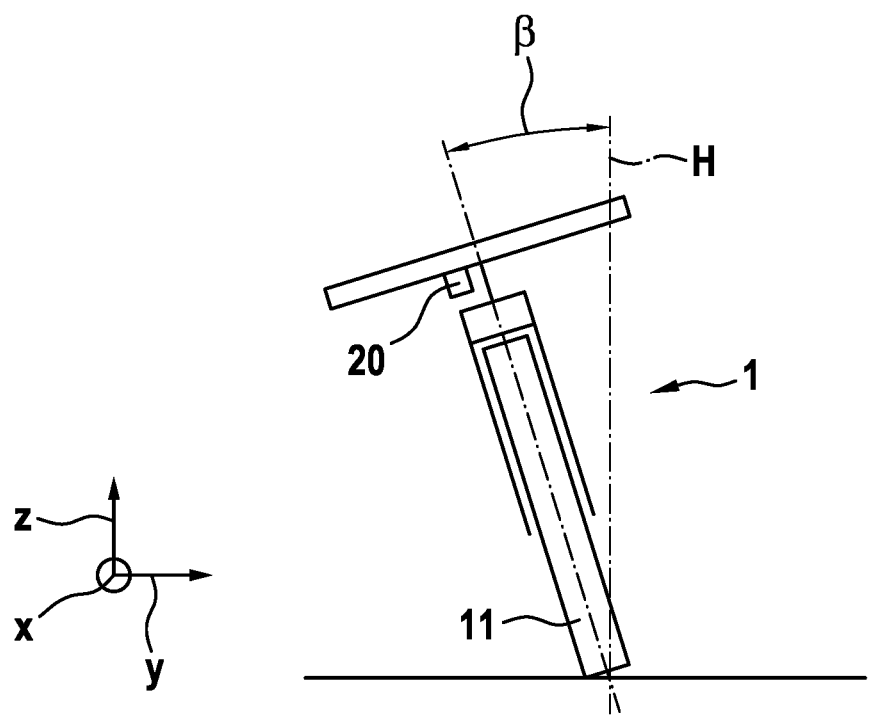
FIG. 3 shows an alternative view of the two-wheeler from FIG. 1 for illustrating an oblique position.

When negotiating a curve with two-wheeler 1, two-wheeler 1 is brought into an oblique position as illustrated in FIG. 3. FIG. 3 schematically shows an inclination angle β of two-wheeler 1. Inclination angle β is the angle by which two-wheeler 1 is inclined from vertical axis H.

Figure 4:
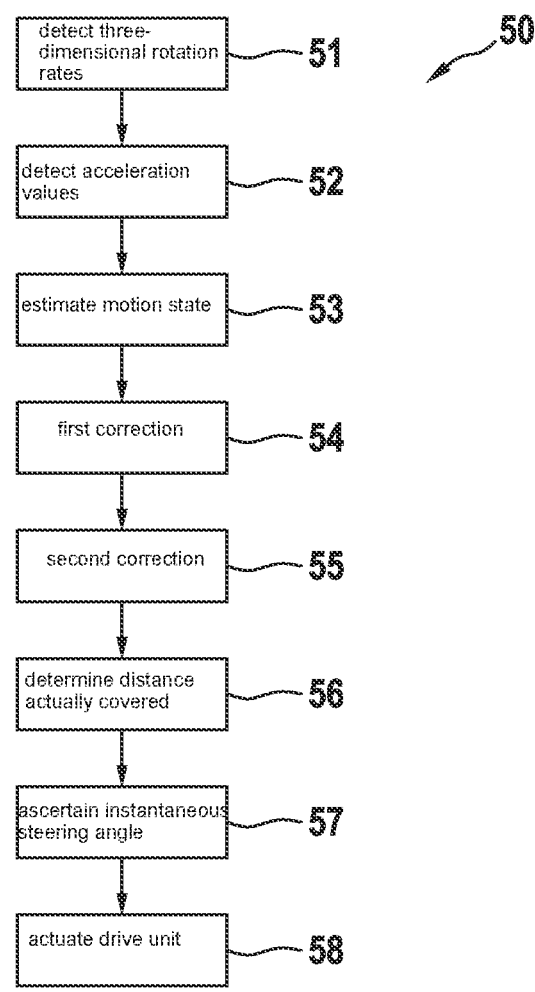
FIG. 4 shows a simplified schematic view of carrying out the method according to the preferred exemplary embodiment of the present invention.

Carrying out method 50 for operating two-wheeler 1 together with ascertaining the motion variables of two-wheeler 1 is described below with reference to FIG. 4.

In method 50, a detection 51 of the three-dimensional rotation rates of two-wheeler 1 initially takes place with the aid of rotation rate sensor 21. At the same time, a detection 52 of the acceleration values of two-wheeler 1 takes place with the aid of acceleration sensor 22. Based on the detected three-dimensional rotation rates, an estimation 53 of a motion state of two-wheeler 1 subsequently takes place.

The motion state of two-wheeler 1 includes estimated values for estimated acceleration values and for an estimated speed and also for an estimated distance covered. In detail, the estimation of the motion state takes place with the aid of a state vector that includes the following parameters: roll angle, pitch angle, longitudinal acceleration, longitudinal speed, and distance covered. In particular, the roll angle corresponds to inclination angle R, i.e., a deflection or a rotation of two-wheeler 1 about longitudinal axis L. The pitch angle preferably corresponds to a deflection or rotation of two-wheeler 1 about the y axis, i.e., transversely with respect to longitudinal axis L.

Based on the state vector and an input vector, the input vector including the three-dimensional rotation rates, a system equation is subsequently created which in particular represents a temporal change in the state vector.

Estimating 53 the motion state of two-wheeler 1 subsequently takes place by computing an integral of the system equation. The estimated motion variables of two-wheeler 1 are present in this way.

Correction steps 54, 55 of the motion state subsequently take place. A first correction 54 of the motion state initially takes place, based on the acceleration values that are actually detected with the aid of acceleration sensor 22.

A second correction 55 of the motion state additionally takes place each time that a measuring pulse of wheel speed sensor 23 is detected. In detail, the motion state is corrected based on the distance actually covered that is ascertained with the aid of wheel speed sensor 23. (Step 56.) Since the distance actually covered may be determined very accurately based on the geometric relationship of the measuring pulses across the circumference of wheel 11, a particularly accurate correction step of the motion state may be carried out with the aid of second correction 55.

Ascertaining 57 steering angle δ of two-wheeler 1 may subsequently take place based on the corrected motion state.

Method 50 may also be carried out in one modification (not illustrated) which additionally takes a standstill of two-wheeler 1 into account. Ascertaining a standstill of two-wheeler 1 additionally takes place based on the estimated motion state.

When a standstill of two-wheeler 1 has been ascertained, the state vector and the system equation may be reduced to the first two states. The situation may thus be avoided that the estimated motion variables drift as time passes, due to the absence of a measuring pulse, which may be used for second correction 55. As soon as it has been ascertained that two-wheeler 1 is once again moving, or as soon as a measuring pulse has once again been detected with the aid of wheel speed sensor 23, the state vector and the system equation are once more expanded to the original states prior to the reduction, so that an accurate determination of all motion variables is subsequently once again made possible.

As an alternative to a standstill of two-wheeler 1, an absence of a measuring pulse of wheel speed sensor 23 may also be used to reduce the state vector and the state equation to the first two states.

The once-corrected or twice-corrected motion state thus includes particularly accurate estimated values for the motion variables of two-wheeler 1. In particular, based on the corrected motion state, at any arbitrary point in time a desired motion variable, such as the speed, may thus be read off and for example used for further systems or methods of two-wheeler 1. In addition, by use of method 50 the motion variables of two-wheeler 1 may be precisely ascertained, even at very low speed, since method 50 is based in particular on the measured values of rotation rate sensor 21 and of acceleration sensor 22, which may provide precise and reliable measured values even at low speeds.

For two-wheeler 1, the ascertained motion variables, in particular steering angle δ, are/is used for actuating 58 drive unit 12 and antilocking system 13, as described below.

Actuating 58 drive unit 12 takes place in such a way that a drive torque generated by drive unit 12 is adapted as a function of ascertained instantaneous steering angle δ. Adapting the drive torque takes place based on a lookup table 30.

Figure 5:
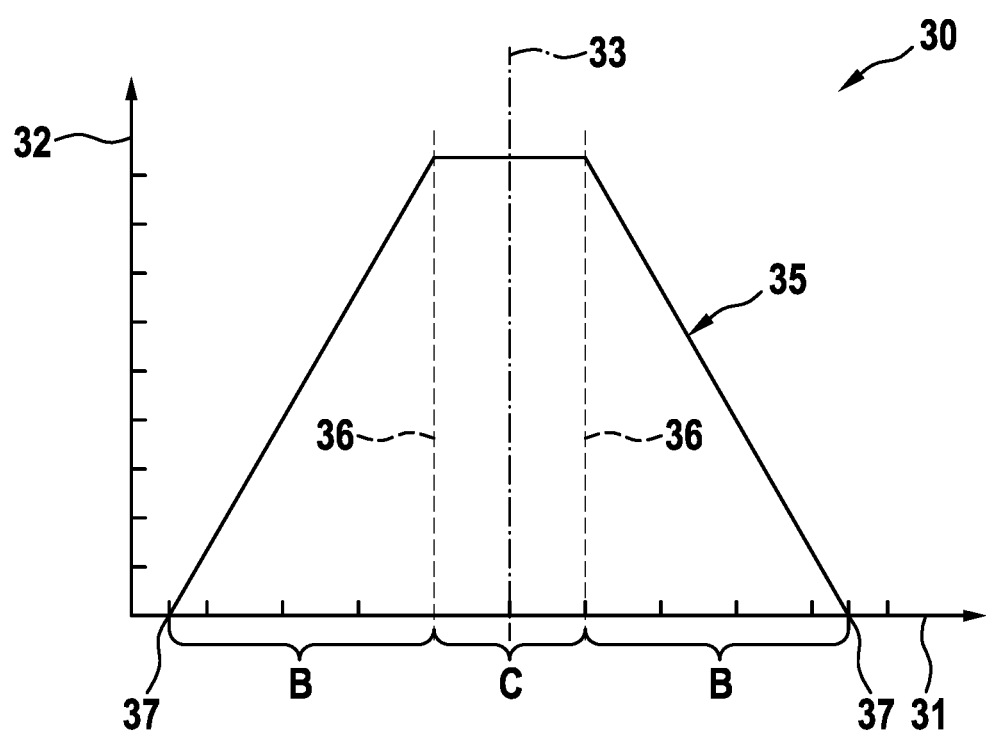
FIG. 5 shows a simplified schematic view of a lookup table that is used in carrying out the method according to one preferred exemplary embodiment of the present invention.

Lookup table 30 is illustrated in FIG. 5. Lookup table 30 is illustrated in the form of a diagram that represents drive torque 32 as a function of steering angle 31. A steering angle δ of 0° is present at axis 33.

Lookup table 30 includes a predefined drive torque profile 35 which defines the drive torque, to be set, as a function of ascertained steering angle δ. Drive torque profile 35 is symmetrical with respect to the 0° steering angle.

As is apparent in FIG. 5, drive torque profile 35 is constant within range C, it being possible to provide the maximum possible drive torque. Range C extends up to a maximum steering angle δ of 10°, in each case denoted by dashed lines 36.

For a steering angle δ greater than 10°, ranges B begin in each case, i.e., for steering to the left and to the right in both directions. A linear dependency of drive torque profile 35 on steering angle δ is present in ranges B. This means that with an increasing steering angle δ, the maximum drive torque proportionally decreases. If steering angle δ is greater than or equal to steering angle δ at points 37, which are situated at a steering angle δ of 45°, for example, the maximum possible drive torque is set to zero. This means that beginning with a steering angle δ of at least 45°, it is no longer possible for drive unit 12 to generate drive torque.

In addition, it may be provided that the drive torque of drive unit 12 is adapted as a function of an instantaneous gradient of a roadway on which two-wheeler 1 is situated. The gradient may, for example, be ascertained directly with the aid of sensor system 2 and/or based on the computed motion state of two-wheeler 1. When a predefined gradient is exceeded, a minimum drive torque of drive unit 12 preferably continues to be provided to allow a motor-assisted riding operation that is comfortable for the rider.

Furthermore, in method 50 for operating two-wheeler 1, actuating 58 antilocking system 13 takes place as a function of ascertained instantaneous steering angle δ. A pressure gradient of a brake pressure, which antilocking system 13 generates in hydraulic braking system 15 during an antilocking operation, is adapted as a function of ascertained steering angle δ. For an optimal braking behavior, it is particularly advantageous when a sensitivity factor and a maximum pressure of the pressure gradient are adapted during a pressure modulation in hydraulic braking system 15 that is carried out by antilocking system 13, based on ascertained instantaneous steering angle δ. In addition, control of a tire slip during braking of two-wheeler 1 may be carried out as a function of instantaneous steering angle δ.

For a particularly simple method of adapting the brake pressure for avoiding critical situations, for example in tight curves, the maximum brake pressure that is allowed in hydraulic braking system 15 may preferably be reduced with increasing steering angle δ. Excessive braking in tight curves, which could result in locking or slipping of wheel 11, may thus be avoided. As the result of using steering angle δ, which is estimated based on the motion state, for actuating 58 antilocking system 13, an antilocking operation that is optimized for negotiating curves with two-wheelers 1 may be provided using particularly simple and cost-effective means, since, for example, a complicated and costly sensor system, such as oblique position sensors or the like, may be dispensed with.

What is claimed is:

1. A method for operating a two-wheeler, the two-wheeler including a drive unit and a sensor system, the sensor system including a rotation rate sensor, an acceleration sensor, and a wheel speed sensor, the wheel speed sensor being configured to detect at least one measuring pulse per revolution of a wheel of the two-wheeler, the method comprising the following steps:

detecting three-dimensional rotation rates of the two-wheeler using the rotation rate sensor;
   detecting acceleration values of the two-wheeler using the acceleration sensor;
   estimating a motion state of the two-wheeler based on the detected rotation rates, the motion state including estimated values for estimated acceleration values and for an estimated speed and for an estimated distance covered;

first correcting of the estimated motion state based on the detected acceleration values;

ascertaining an instantaneous steering angle of the two-wheeler based on the corrected estimated motion state; and actuating the drive unit and/or an antilocking system of the two-wheeler as a function of the ascertained instantaneous steering angle.

2. The method as recited in claim 1, wherein the actuation of the drive unit includes adapting a drive torque of the drive unit.

3. The method as recited in claim 2, wherein the drive torque of the drive unit is adapted based on a lookup table that includes a predefined drive torque profile as a function of the steering angle.

4. The method as recited in claim 3, wherein the drive torque profile is constant up to a predefined maximum steering angle, and for a steering angle greater than the predefined maximum steering angle, the drive torque profile is linearly dependent on the steering angle.

5. The method as recited in claim 4, wherein the predefined maximum steering angle is 10°.

6. The method as recited in claim 2, further comprising:
ascertaining an instantaneous gradient of a roadway on which the two-wheeler is situated, wherein the drive torque of the drive unit additionally being adapted as a function of the gradient.

7. The method as recited in claim 1, wherein the actuation of the antilocking system includes:
adapting a brake pressure in a braking system of the two-wheeler.

8. The method as recited in claim 7, wherein the adaptation of a brake pressure includes:
controlling a pressure gradient of the brake pressure.

9. The method as recited in claim 8, wherein the controlling of the pressure gradient includes controlling a sensitivity factor and/or a maximum pressure of the pressure gradient.

10. The method as recited in claim 7, wherein the adaptation of brake pressure includes:
controlling a tire slip during a braking operation of the two-wheeler.

11. The method as recited in claim 1, further comprising:
ascertaining an instantaneous speed of the two-wheeler and/or a distance covered by the two-wheeler based on the corrected estimated motion state.

12. The method as recited in claim 1, further comprising:
second correcting of the estimated motion state based on the measuring pulses that are detected using the wheel speed sensor.

13. The method as recited in claim 12, wherein the second correction is carried out based on the following equation:

$$y2 = [x5, \text{old} + 2\pi r]$$

using a corrected value for a distance y2 covered by the two-wheeler, an old value for a distance x5, old covered by the two-wheeler, and a radius r of a wheel of the two-wheeler.

14. The method as recited in claim 1, wherein one or multiple of the following motion variables of the two-wheeler are ascertained based on the corrected estimated motion state: roll angle, pitch angle, longitudinal acceleration distance covered.

15. The method as recited in claim 1, wherein the first correction is carried out using a nonlinear Kalman filter.

16. The method as recited in claim 1, wherein the estimation of the motion state of the two-wheeler takes place using a state vector $$x = \begin{bmatrix} x1 \\ x2 \\ x3 \\ x4 \\ x5 \end{bmatrix},$$

where x1 is a roll angle, x2 is a pitch angle, x3 is a longitudinal acceleration, x4 is a longitudinal speed, and x5 is a covered distance, and using an input vector $$u = \begin{bmatrix} u1 \\ u2 \\ u3 \end{bmatrix},$$

where u1, u2, and u3 are the three-dimensional rotation rates, and based on the following system equation:

$$\dot{x} = \begin{bmatrix} u1 + \tan(x2)\sin(x1)u2 + \tan(x2)\cos(x1)u3 \\ \cos(x1)u2 - \sin(x1)u3 \\ 0 \\ x3 \\ x4 \end{bmatrix},$$

the estimation of the motion state of the two-wheeler taking place based on a computation of an integral of the system equation $\dot{x}$, the estimation of the motion state of the two-wheeler also being carried out based on the following equations:

$$Rx = \begin{bmatrix} 1 & 0 & 0 \\ 0 & \cos(x1) & \sin(x1) \end{bmatrix},$$

$$Ry = \begin{bmatrix} \cos(x2) & 0 & -\sin(x2) \\ 0 & 1 & 0 \\ \sin(x2) & 0 & \cos(x2) \end{bmatrix},$$

$$\dot{\psi} = \frac{(u2\sin(x1) + u3\cos(x1))}{\cos(x2)},$$

$$y1 = RxRy \begin{bmatrix} x3 \\ -x4\dot{\psi} \\ g \end{bmatrix},$$

where $\dot{\psi}$ is a yaw rate of the two-wheeler, and y1 are the estimated acceleration values of the two-wheeler.

17. A two-wheeler, in particular an electrically driven bicycle, comprising:
a drive unit;
an antilocking system;
a sensor system that includes a rotation rate sensor, an acceleration sensor, and a wheel speed sensor; and
a control device configured to controllably actuate the drive unit and the antilocking system, the control device configured to:
detect three-dimensional rotation rates of the two-wheeler using the rotation rate sensor;
detect acceleration values of the two-wheeler using the acceleration sensor;

estimate a motion state of the two-wheeler based on the detected rotation rates, the motion state including estimated values for estimated acceleration values and for an estimated speed and for an estimated distance covered;

first correction of the estimated motion state based on the detected acceleration values;

ascertain an instantaneous steering angle of the two-wheeler based on the corrected estimated motion state; and actuate the drive unit and/or the antilocking system of the two-wheeler as a function of the ascertained instantaneous steering angle.

18. The two-wheeler as recited in claim 17, wherein the two-wheeler is an electrically driving bicycle.

* * * * *